United States Patent [19]

Dornbush et al.

[11] Patent Number: 4,591,974

[45] Date of Patent: May 27, 1986

[54] INFORMATION RECORDING AND RETRIEVAL SYSTEM

[75] Inventors: Donald H. Dornbush; Donald J. Bowersox, both of Okemos, Mich.

[73] Assignee: Technology Venture Management, Inc., Lansing, Mich.

[21] Appl. No.: 575,471

[22] Filed: Jan. 31, 1984

[51] Int. Cl.⁴ .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,566,365 | 9/1968 | Rawson et al. | 364/200 |
| 3,940,742 | 2/1976 | Hudspeth | 364/900 |
| 3,942,157 | 3/1976 | Azure | 364/900 |
| 3,956,740 | 5/1976 | Jones et al. | 364/900 |
| 4,005,388 | 1/1977 | Morley | 364/200 |
| 4,007,443 | 2/1977 | Bromberg et al. | 364/200 |
| 4,019,174 | 4/1977 | Vanderpool | 364/900 |
| 4,090,247 | 5/1978 | Martin | 364/900 |
| 4,107,784 | 8/1978 | VanBemmelen | |
| 4,115,870 | 9/1978 | Lowell | 364/900 |
| 4,121,574 | 10/1978 | Lester | |
| 4,125,871 | 11/1978 | Martin | 364/900 |
| 4,143,417 | 3/1979 | Wald | 364/900 |
| 4,169,290 | 9/1979 | Reed et al. | 364/900 |
| 4,216,462 | 8/1980 | McGrath et al. | |
| 4,279,021 | 7/1981 | See et al. | 364/900 |
| 4,364,112 | 12/1982 | Onodera | 364/200 |

Primary Examiner—Raulfe B. Sache
Attorney, Agent, or Firm—Ian C. McLeod

[57] ABSTRACT

A method and system for information recording and retrieval using a hand held computer and a host microcomputer is described. The computers are provided with a communications link and application programs enabling table forms for recording of data items in the hand held computer and for the transfer of the data items to the host microcomputer having programs enabling the same table forms. The application program in the host computer is of the field definition and screen format type for recording data items in table form. The hand held computer can create the screens and the field definitions as well as run the screens. The host computer can only run the screens. This format is particularly useful for recording hospital data items.

12 Claims, 41 Drawing Figures

Microfiche Appendix Included
(3 Microfiche, 126 Pages)

NURSERY
INFORMATION
SYSTEM (HELLO SCREEN)

PLEASE ENTER YOUR :

| STAFF NUMBER | |
| --- | --- |
| IDENTIFICATION | |
| NAME | |

(FRM101)

FIG. 3

USER ▓▓▓▓▓▓▓▓▓▓▓▓▓▓▓▓▓▓▓▓▓▓▓▓▓▓▓▓▓ DATE ▓▓▓▓▓▓▓▓▓▓

```
         NURSERY
       INFORMATION
         SYSTEM
```

(COLLECT PATIENT DATA)     (FRM110)

PATIENT SELECTION METHOD: ▓▓▓▓▓▓▓▓▓▓▓▓▓▓▓▓▓▓▓▓▓▓▓▓▓▓▓
  SELECTION OPTIONS:
    PATIENT NAME
    PATIENT ROOM NUMBER
    PATIENT NUMBER

PATIENT NAME:        ▓▓▓▓▓▓▓▓▓▓▓▓▓▓▓▓▓▓▓▓▓▓▓▓
PATIENT ROOM NUMBER: ▓▓▓▓▓▓▓
PATIENT NUMBER:      ▓▓▓▓▓▓▓▓▓

PATIENT NAME:        ▓▓▓▓▓▓▓▓▓▓▓▓▓▓▓▓▓▓▓▓▓▓▓▓▓▓▓▓▓▓▓
PATIENT NUMBER:      ▓▓▓▓▓▓▓▓▓▓▓▓
PATIENT ROOM NUMBER: ▓▓▓▓▓▓▓

SELECT A DATA COLLECTION PROCEDURE: ▓▓▓▓▓▓▓▓▓▓▓▓▓▓▓▓▓▓▓▓▓▓▓

| ITEM | DATA |
|---|---|
| 1. ▓▓▓▓▓▓▓▓▓▓▓▓▓▓▓▓▓▓ | ▓▓▓▓▓▓▓▓▓▓▓▓▓▓▓▓ |
| 2. ▓▓▓▓▓▓▓▓▓▓▓▓▓▓▓▓▓▓ | ▓▓▓▓▓▓▓▓▓▓▓▓▓▓▓▓ |
| 3. ▓▓▓▓▓▓▓▓▓▓▓▓▓▓▓▓▓▓ | ▓▓▓▓▓▓▓▓▓▓▓▓▓▓▓▓ |
| 4. ▓▓▓▓▓▓▓▓▓▓▓▓▓▓▓▓▓▓ | ▓▓▓▓▓▓▓▓▓▓▓▓▓▓▓▓ |
| 5. ▓▓▓▓▓▓▓▓▓▓▓▓▓▓▓▓▓▓ | ▓▓▓▓▓▓▓▓▓▓▓▓▓▓▓▓ |
| 6. ▓▓▓▓▓▓▓▓▓▓▓▓▓▓▓▓▓▓ | ▓▓▓▓▓▓▓▓▓▓▓▓▓▓▓▓ |
| 7. ▓▓▓▓▓▓▓▓▓▓▓▓▓▓▓▓▓▓ | ▓▓▓▓▓▓▓▓▓▓▓▓▓▓▓▓ |
| 8. ▓▓▓▓▓▓▓▓▓▓▓▓▓▓▓▓▓▓ | ▓▓▓▓▓▓▓▓▓▓▓▓▓▓▓▓ |
| 9. ▓▓▓▓▓▓▓▓▓▓▓▓▓▓▓▓▓▓ | ▓▓▓▓▓▓▓▓▓▓▓▓▓▓▓▓ |
| 10. ▓▓▓▓▓▓▓▓▓▓▓▓▓▓▓▓▓▓ | ▓▓▓▓▓▓▓▓▓▓▓▓▓▓▓▓ |

| ITEM | DATA |
|---|---|
| 11. ▓▓▓▓▓▓▓▓▓▓▓▓▓▓▓▓▓▓ | ▓▓▓▓▓▓▓▓▓▓▓▓▓▓▓▓ |
| 12. ▓▓▓▓▓▓▓▓▓▓▓▓▓▓▓▓▓▓ | ▓▓▓▓▓▓▓▓▓▓▓▓▓▓▓▓ |
| 13. ▓▓▓▓▓▓▓▓▓▓▓▓▓▓▓▓▓▓ | ▓▓▓▓▓▓▓▓▓▓▓▓▓▓▓▓ |
| 14. ▓▓▓▓▓▓▓▓▓▓▓▓▓▓▓▓▓▓ | ▓▓▓▓▓▓▓▓▓▓▓▓▓▓▓▓ |
| 15. ▓▓▓▓▓▓▓▓▓▓▓▓▓▓▓▓▓▓ | ▓▓▓▓▓▓▓▓▓▓▓▓▓▓▓▓ |
| 16. ▓▓▓▓▓▓▓▓▓▓▓▓▓▓▓▓▓▓ | ▓▓▓▓▓▓▓▓▓▓▓▓▓▓▓▓ |
| 17. ▓▓▓▓▓▓▓▓▓▓▓▓▓▓▓▓▓▓ | ▓▓▓▓▓▓▓▓▓▓▓▓▓▓▓▓ |
| 18. ▓▓▓▓▓▓▓▓▓▓▓▓▓▓▓▓▓▓ | ▓▓▓▓▓▓▓▓▓▓▓▓▓▓▓▓ |
| 19. ▓▓▓▓▓▓▓▓▓▓▓▓▓▓▓▓▓▓ | ▓▓▓▓▓▓▓▓▓▓▓▓▓▓▓▓ |
| 20. ▓▓▓▓▓▓▓▓▓▓▓▓▓▓▓▓▓▓ | ▓▓▓▓▓▓▓▓▓▓▓▓▓▓▓▓ |

FIG. 5

USER ▓▓▓▓▓▓▓▓▓▓▓▓▓▓▓▓▓▓▓▓▓▓▓▓▓▓▓▓▓  DATE ▓▓▓▓▓▓

```
         NURSERY
         INFORMATION
         SYSTEM
```

(BABY'S INITIAL ASSESSMENT)                              (FRM121)

ADD OR RETRIEVE INITIAL ASSESSMENT ▓▓▓▓▓▓▓

PATIENT SELECTION METHOD:   ▓▓▓▓▓▓▓▓▓▓▓▓▓▓▓▓▓
              OPTIONS: Patient Name
                       Patient Room Number
                       Patient Number
BABY'S LAST NAME: ▓▓▓▓▓▓▓▓▓▓▓▓▓▓▓▓▓▓▓
    BABY'S ROOM NUMBER: ▓▓▓▓▓▓
    PATIENT NUMBER: ▓▓▓▓▓▓▓

BABY'S NAME ▓▓▓▓▓▓▓▓▓▓▓▓▓▓▓▓▓▓▓▓▓▓  NUMBER ▓▓▓▓▓  ROOM ▓▓▓▓

- ROOM TEMPERATURE ▓▓▓▓▓▓▓▓▓▓▓▓
- PULSE ▓▓▓▓▓▓▓▓▓▓▓▓▓
- RESPIRATION ▓▓▓▓▓▓▓▓▓▓
- BLOOD PRESSURE ▓▓▓▓▓▓▓▓▓▓▓
- TEMPERATURE ▓▓▓▓▓▓▓▓▓▓▓

BABY'S NAME ▓▓▓▓▓▓▓▓▓▓▓▓▓▓▓▓▓▓▓▓▓▓  NUMBER ▓▓▓▓▓  ROOM ▓▓▓▓

- VOIDING NUMBER ▓▓▓▓▓▓▓▓▓▓▓▓▓▓
- VOIDING AMOUNT ▓▓▓▓▓▓▓▓▓▓▓▓▓▓
- (s) TYPE OF STOOLS ▓▓▓▓▓▓▓▓▓▓▓▓
- (s) COLOR OF STOOLS ▓▓▓▓▓▓▓▓▓▓▓▓
- (s) FEEDING TYPE ▓▓▓▓▓▓▓▓▓▓▓▓
- INTAKE TOTAL ▓▓▓▓▓▓▓▓▓▓▓▓▓▓

FIG. 7

| USER ▮▮▮▮▮▮▮▮▮▮▮▮▮▮▮▮▮ | DATE ▮▮▮▮▮▮▮▮▮ |
|---|---|

NURSERY
INFORMATION
SYSTEM (MOTHER'S INITIAL ASSESSMENT)    (FRM126)

ADD OR RETRIEVE INITIAL ASSESSMENT ▮▮▮▮▮▮▮▮

PATIENT SELECTION METHOD: ▮▮▮▮▮▮▮▮▮▮▮▮▮▮▮
          OPTIONS: Patient Name
                   Patient Room Number
                   Patient Number
MOTHER'S LAST NAME: ▮▮▮▮▮▮▮▮▮▮▮▮▮▮▮▮▮▮
   MOTHER'S ROOM NUMBER: ▮▮▮▮▮▮
MOTHER'S PATIENT NUMBER: ▮▮▮▮▮▮▮▮

MOTHER'S NAME ▮▮▮▮▮▮▮▮▮▮▮▮▮▮▮▮▮▮▮▮▮▮▮▮   NUMBER ▮▮▮▮▮▮▮▮▮   ROOM ▮▮▮▮▮▮

- MARITAL STATUS  ▮▮▮▮▮▮▮▮▮▮▮▮▮▮▮▮▮▮▮▮
- AGE  ▮▮▮▮▮▮▮▮▮▮▮▮▮▮▮▮▮▮▮▮
- RACE  ▮▮▮▮▮▮▮▮▮▮▮▮▮▮▮▮▮▮▮▮
- WEIGHT  ▮▮▮▮▮▮▮▮▮▮▮▮▮▮▮▮▮▮▮▮
- HEIGHT  ▮▮▮▮▮▮▮▮▮▮▮▮▮▮▮▮▮▮▮▮

MOTHER'S NAME ▮▮▮▮▮▮▮▮▮▮▮▮▮▮▮▮▮▮▮▮▮▮▮▮   NUMBER ▮▮▮▮▮▮▮▮▮   ROOM ▮▮▮▮▮▮

- TERMPERATURE  ▮▮▮▮▮▮▮▮▮▮▮▮▮▮▮▮▮▮
- PULSE  ▮▮▮▮▮▮▮▮▮▮▮▮▮▮▮▮
- RESPIRATION  ▮▮▮▮▮▮▮▮▮▮▮▮▮▮▮▮
- BLOOD PRESSURE RT  ▮▮▮▮▮▮▮▮▮▮▮▮▮▮▮▮▮▮
- BLOOD PRESSURE LT  ▮▮▮▮▮▮▮▮▮▮▮▮▮▮▮▮▮▮
- FETAL HEART TONES  ▮▮▮▮▮▮▮▮▮▮▮▮▮▮▮▮▮▮

FIG. 8

```
USER ▓▓▓▓▓▓▓▓▓▓▓▓▓▓▓▓▓                                              DATE ▓▓▓▓▓▓▓▓

┌─────────────┐
                        │   NURSERY   │
                        │ INFORMATION │
                        │   SYSTEM    │
                        └─────────────┘

(PATIENT DISCHARGE)                    (FRM150)

PATIENT SELECTION METHOD: ▓▓▓▓▓▓▓▓▓▓▓▓▓▓▓▓▓
                             OPTIONS: Patient Name
                                      Patient Room Number
                                      Patient Number BABY'S LAST NAME:   ▓▓▓▓▓▓▓▓▓▓▓▓▓▓▓▓▓▓▓▓▓▓▓
              BABY'S ROOM NUMBER: ▓▓▓▓▓▓▓
              PATIENT NUMBER:     ▓▓▓▓▓▓▓▓▓
```

```
BABY'S NAME ▓▓▓▓▓▓▓▓▓▓▓▓▓▓▓▓▓▓▓▓▓▓▓▓▓▓▓  NUMBER ▓▓▓▓▓▓▓▓▓▓  ROOM ▓▓▓▓▓▓

DISCHARGE DATE   ▓▓▓▓▓▓▓▓▓▓▓▓▓▓▓▓▓▓

DISCHARGE TIME   ▓▓▓▓▓▓▓▓▓▓▓▓▓▓▓▓▓▓
```

USER ▓▓▓▓▓▓▓▓▓▓▓▓▓▓▓▓▓▓▓▓▓▓▓▓▓▓ DATE ▓▓▓▓▓▓

NURSERY
INFORMATION
SYSTEM (SYSTEM MAINTENANCE) (FRM170)

PLEASE SELECT THE DESIRED MAINTENANCE TASK ▓▓▓▓▓▓▓▓▓▓▓▓▓▓▓▓▓▓

OPTIONS:
　　User Maintenance
　　Procedure Maintenance
　　Item Maintenance
　　Procedure Detail

(rotated form)

USER ▮▮▮▮▮▮▮▮▮▮  DATE ▮▮▮▮▮▮

(NURSERY INFORMATION SYSTEM)

(PROCEDURE MAINTENANCE) (FRM172)

WORK REQUEST TYPE : ▮▮▮▮▮▮▮▮▮▮

| SELECT PROCEDURE | ▮▮▮▮▮▮▮▮▮▮ | ▮▮▮▮▮▮▮▮▮▮ | PROCEDURE NUMBER ▮▮▮▮ |
| FROCEDURE NAME | ▮▮▮▮▮▮▮▮▮▮ | ▮▮▮▮▮▮▮▮▮▮ | |
| PORTABLE COPY COUNT | ▮▮ | | |

| USER ███████████████ | | DATE ████████ |
|---|---|---|
| | NURSERY INFORMATION SYSTEM | |
| (DISCHARGE ASSESSMENT) | | (FRM190) |

ADD OR RETRIEVE DISCHARGE ASSESSMENT ████████

PATIENT SELECTION METHOD: ████████████████
               OPTIONS: Patient Name
                        Patient Room Number
                        Patient Number
BABY'S LAST NAME: ████████████████
  BABY'S ROOM NUMBER: ██████
  PATIENT NUMBER: ████████

BABY'S NAME ████████████████████████ NUMBER ████████ ROOM ██████
TEACHING:

| FEEDING CARE | ████████████████████ |
|---|---|
| DIAPER CARE | ████████████████████ |
| BATH CARE | ████████████████████ |
| CORD CARE | ████████████████████ |
| CIRCUMCISION CARE | ████████████████████ |
| TEMPERATURE CARE | ████████████████████ |

BABY'S NAME ████████████████████████ NUMBER ████████ ROOM ██████
DISCHARGE OBSERVATIONS

| WEIGHT | ████████████████████ |
|---|---|
| INFECTION | ████████████████████ |
| SKIN | ████████████████████ |
| NAVEL | ████████████████████ |
| GENITILIA | ████████████████████ |

| DISCHARGED TO | ████████████████████ |
|---|---|
| BY WHEELCHAIR | ████████████████████ |

COMMENTS
████████████████
████████████████
████████████████
████████████████
████████████████
████████████████

FIG. 16

USER ▓▓▓▓▓▓▓▓▓▓▓▓▓▓▓▓▓▓▓▓  DATE ▓▓▓▓▓▓

NURSERY
INFORMATION
SYSTEM (USER SIGNOFF)    (FRM199)

DO YOU WISH TO SIGNOFF ?  ▓▓▓  (Yes or No)

THANK YOU
▓▓▓▓▓▓▓▓▓▓▓▓▓▓
FOR USING THE
NURSERY INFORMATION SYSTEM

FIG. 17

USER ████████████████████████ DATE ████████

```
          ┌──────────────┐
          │   NURSERY    │
          │ INFORMATION  │
          │    SYSTEM    │
          └──────────────┘

(REPORT PRINTER)                    (FRM9001)

DO YOU WISH TO OBTAIN HARD-COPY REPORTS ?  ███   (Yes or No)

┌────────────────────────────┐
                  │ REPORT NUMBER  █           │
                  │ SHIFT          █           │
                  │ DATE           ██████████  │
                  └────────────────────────────┘

┌──────────────────────────────┐
      │ THANK YOU                    │
      │ ████████████████████████████ │
      │ LOADING THE NIS              │
      │ REPORT GENERATOR             │
      └──────────────────────────────┘
```

FIG. 18

PATIENT SELECTION

```
USER:     <STAFF-ID>   mm/dd/yy    hh:mm AM
MOTHER: <PATIENT-ID>            LOC:
PROCED: <PROCEDURE> PAT: <PATIENT NAME>
  1. <PATIENT NO.1>    4. <PATIENT NO.4>
  2. <PATIENT NO.2>    5. <PATIENT NO.5>
  3. <PATIENT NO.3>    6. <PATIENT NO.6>
SELECTION: <PATIENT SELECTION>
PAT1 PAT2 PAT3 PAT4 PAT5 PAT6 NEW   NEXT
```

FIG. 20

PROCEDURE SELECTION

```
USER:     <STAFF-ID>   mm/dd/yy    hh:mm AM
MOTHER: <PATIENT-ID>            LOC:
PROCED: <PROCEDURE> PAT: <PATIENT NAME>
  1. <PROCED NO.1>     4. <PROCED NO.4>
  2. <PROCED NO.2>     5. <PROCED NO.5>
  3. <PROCED NO.3>     6. <PROCED NO.6>
SELECTION: <PROCED SELECTION>
PRO1 PRO2 PRO3 PRO4 PRO5 PRO6       NEXT
```

FIG. 21

PROCEDURE:  DISCHARGE PATIENT

```
USER:     <STAFF-ID>   mm/dd/yy    hh:mm AM
MOTHER: <PATIENT-ID>            LOC:
PROCED: <PROCEDURE> PAT: <PATIENT NAME>
DISCHARGE DATE         .....<ITEM DATA>....
DISCHARGE TIME         .....<ITEM DATA>....

FCT1 FCT2 FCT3 FCT4 FCT5 FCT6 FCT7 FCT8
```

FIG. 22

PROCEDURE: BABY INITIAL ASSESSMENT

```
USER:     <STAFF-ID>   mm/dd/yy    hh:mm AM
MOTHER:   <PATIENT-ID>             LOC:
PROCED:   <PROCEDURE>  PAT: <PATIENT NAME>
ROOM TEMPERATURE         .....<ITEM DATA>....
PULSE                    .....<ITEM DATA>....
RESPIRATION              .....<ITEM DATA>....
BLOOD PRESSURE           .....<ITEM DATA>....
xTEMPERATURE             .....<ITEM DATA>....x
xVOIDING NUMBER          .....<ITEM DATA>....x
xVOIDING AMOUNT          .....<ITEM DATA>....x
xSTOOL TYPE              .....<ITEM DATA>....x
xSTOOL COLOR             .....<ITEM DATA>....x
xFEEDING TYPE            .....<ITEM DATA>....x
xINTAKE TOTAL            .....<ITEM DATA>....x
xWEIGHT                  .....<ITEM DATA>....x
xLENGTH                  .....<ITEM DATA>....x
xHEAD SIZE               .....<ITEM DATA>....x
xCHEST SIZE              .....<ITEM DATA>....x
xBATH GIVEN BY           .....<ITEM DATA>....x
 FCT1 FCT2 FCT3 FCT4 FCT5 FCT6 FCT7 FCT8
```

FIG. 23

PROCEDURE: MOTHER INITIAL ASSESSMENT

```
USER:     <STAFF-ID>   mm/dd/yy    hh:mm AM
MOTHER:   <PATIENT-ID>             LOC:
PROCED:   <PROCEDURE>  PAT: <PATIENT NAME>
SEX                      .....<ITEM DATA>....
AGE                      .....<ITEM DATA>....
RACE                     .....<ITEM DATA>....
WEIGHT                   .....<ITEM DATA>....
xHEIGHT                  .....<ITEM DATA>....x
xTEMPERATURE             .....<ITEM DATA>....x
xPULSE                   .....<ITEM DATA>....x
xRESPIRATION             .....<ITEM DATA>....x
xBLOOD PRESSURE LT       .....<ITEM DATA>....x
xBLOOD PRESSURE RT       .....<ITEM DATA>....x
xFETAL HEART TONES       .....<ITEM DATA>....x
xMARITAL STATUS          .....<ITEM DATA>....x
xDATE                    .....<ITEM DATA>....x
xTIME                    .....<ITEM DATA>....x
 FCT1 FCT2 FCT3 FCT4 FCT5 FCT6 FCT7 FCT8
```

FIG. 24

PROCEDURE: DISCHARGE ASSESSMENT

```
USER:      <STAFF-ID>  mm/dd/yy     hh:mm AM
MOTHER:  <PATIENT-ID>              LOC:
PROCED:  <PROCEDURE> PAT: <PATIENT NAME>
FEEDING CARE             .....<ITEM DATA>....
DIAPER CARE              .....<ITEM DATA>....
BATH CARE                .....<ITEM DATA>....
CORD CARE                .....<ITEM DATA>....
xCIRCUMCISION CARE       .....<ITEM DATA>....x
xWEIGHT                  .....<ITEM DATA>....x
xINFECTION PRESENT       .....<ITEM DATA>....x
xSKIN                    .....<ITEM DATA>....x
xNAVEL                   .....<ITEM DATA>....x
xGENITALIA               .....<ITEM DATA>....x
xDISCHARGED TO           .....<ITEM DATA>....x
xBY WHEELCHAIR           .....<ITEM DATA>....x
xCOMMENTS                .....<ITEM DATA>....x
xCOMMENTS                .....<ITEM DATA>....x
 FCT1 FCT2 FCT3 FCT4 FCT5 FCT6 FCT7 FCT8
```

FIG. 25

PROCEDURE: VITALS

```
USER:      <STAFF-ID>  mm/dd/yy     hh:mm AM
MOTHER:  <PATIENT-ID>              LOC:
PROCED:  <PROCEDURE> PAT: <PATIENT NAME>
ROOM TEMPERATURE         .....<ITEM DATA>....
PULSE                    .....<ITEM DATA>....
RESPIRATION              .....<ITEM DATA>....
BLOOD PRESSURE           .....<ITEM DATA>....
xTEMPERATURE             .....<ITEM DATA>....x
 FCT1 FCT2 FCT3 FCT4 FCT5 FCT6 FCT7 FCT8
```

FIG. 26

PROCEDURE: FEEDING

```
USER:      <STAFF-ID>  mm/dd/yy     hh:mm AM
MOTHER:  <PATIENT-ID>              LOC:
PROCED:  <PROCEDURE> PAT: <PATIENT NAME>
FEEDING TYPE             .....<ITEM DATA>....
INTAKE TOTAL             .....<ITEM DATA>....

FCT1 FCT2 FCT3 FCT4 FCT5 FCT6 FCT7 FCT8
```

FIG. 27

PROCEDURE: OUTPUT

```
USER:     <STAFF-ID>  mm/dd/yy    hh:mm AM
MOTHER:  <PATIENT-ID>             LOC:
PROCED:  <PROCEDURE> PAT: <PATIENT NAME>
VOIDING NUMBER          .....<ITEM DATA>....
VOIDING AMOUNT          .....<ITEM DATA>....
STOOL COLOR             .....<ITEM DATA>....
STOOL TYPE              .....<ITEM DATA>....
FCT1 FCT2 FCT3 FCT4 FCT5 FCT6 FCT7 FCT8
```

FIG. 28

PROCEDURE: SHIFT-ONE

```
USER:     <STAFF-ID>  mm/dd/yy    hh:mm AM
MOTHER:  <PATIENT-ID>             LOC:
PROCED:  <PROCEDURE> PAT: <PATIENT NAME>
ROOM TEMPERATURE        .....<ITEM DATA>....
PULSE                   .....<ITEM DATA>....
RESPIRATION             .....<ITEM DATA>....
BLOOD PRESSURE          .....<ITEM DATA>....
xTEMPERATURE            .....<ITEM DATA>....x
xBATH GIVEN BY          .....<ITEM DATA>....x
xWEIGHT                 .....<ITEM DATA>....x
xPATIENT COLOR          .....<ITEM DATA>....x
FCT1 FCT2 FCT3 FCT4 FCT5 FCT6 FCT7 FCT8
```

FIG. 29

PROCEDURE: SHIFT 2/3

```
USER:     <STAFF-ID>  mm/dd/yy    hh:mm AM
MOTHER:  <PATIENT-ID>             LOC:
PROCED:  <PROCEDURE> PAT: <PATIENT NAME>
TEMPERATURE             .....<ITEM DATA>....
PULSE                   .....<ITEM DATA>....
RESPIRATION             .....<ITEM DATA>....
PATIENT COLOR           .....<ITEM DATA>....
FCT1 FCT2 FCT3 FCT4 FCT5 FCT6 FCT7 FCT8
```

FIG. 30

PROCEDURE: MEDICATIONS

```
USER:     <STAFF-ID>   mm/dd/yy    hh:mm AM
MOTHER:   <PATIENT-ID>            LOC:
PROCED:   <PROCEDURE>  PAT: <PATIENT NAME>
DATE                    .....<ITEM DATA>....
TIME                    .....<ITEM DATA>....
SHIFT                   .....<ITEM DATA>....
MEDICATION NAME 1       .....<ITEM DATA>....
xMEDICATION NAME 2      .....<ITEM DATA>....x
xMEDICATION NAME 3      .....<ITEM DATA>....x
xINJECTION LOCATION     .....<ITEM DATA>....x
FCT1 FCT2 FCT3 FCT4 FCT5 FCT6 FCT7 FCT8
```

FIG. 31

PROCEDURE: COMMENTS - BRIEF

```
USER:     <STAFF-ID>   mm/dd/yy    hh:mm AM
MOTHER:   <PATIENT-ID>            LOC:
PROCED:   <PROCEDURE>  PAT: <PATIENT NAME>
DATE                    .....<ITEM DATA>....
TIME                    .....<ITEM DATA>....
COMMENTS                .....<ITEM DATA>....
COMMENTS                .....<ITEM DATA>....
xCOMMENTS               .....<ITEM DATA>....x
xCOMMENTS               .....<ITEM DATA>....x
xCOMMENTS               .....<ITEM DATA>....x
xCOMMENTS               .....<ITEM DATA>....x
FCT1 FCT2 FCT3 FCT4 FCT5 FCT6 FCT7 FCT8
```

FIG. 32

PROCEDURE: COMMENTS - EXTENSIVE

```
USER:     <STAFF-ID>   mm/dd/yy    hh:mm AM
MOTHER:   <PATIENT-ID>             LOC:
PROCED:   <PROCEDURE> PAT: <PATIENT NAME>
DATE                  .....<ITEM DATA>....
TIME                  .....<ITEM DATA>....
COMMENTS              .....<ITEM DATA>....
COMMENTS              .....<ITEM DATA>....
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
xCOMMENTS             .....<ITEM DATA>....x
FCT1 FCT2 FCT3 FCT4 FCT5 FCT6 FCT7 FCT8
```

FIG. 33

PROCEDURE: FIRST BATH

```
USER:     <STAFF-ID>   mm/dd/yy    hh:mm AM
MOTHER:   <PATIENT-ID>             LOC:
PROCED:   <PROCEDURE> PAT: <PATIENT NAME>
TEMPERATURE           .....<ITEM DATA>....
WEIGHT                .....<ITEM DATA>....
PULSE                 .....<ITEM DATA>....
RESPIRATION           .....<ITEM DATA>....
xBATH GIVEN BY        .....<ITEM DATA>....x
FCT1 FCT2 FCT3 FCT4 FCT5 FCT6 FCT7 FCT8
```

FIG. 34

PROCEDURE: COLOR

```
USER:      <STAFF-ID>   mm/dd/yy      hh:mm AM
MOTHER:    <PATIENT-ID>               LOC:
PROCED:    <PROCEDURE>  PAT: <PATIENT NAME>
COLOR                   .....<ITEM DATA>....
PLETHORIC               .....<ITEM DATA>....
JAUNDICE                .....<ITEM DATA>....
CYANOTIC                .....<ITEM DATA>....
xMECONIUM STAINING      .....<ITEM DATA>....x
xCOMMENTS               .....<ITEM DATA>....x
xCOMMENTS               .....<ITEM DATA>....x
xCOMMENTS               .....<ITEM DATA>....x
xCOMMENTS               .....<ITEM DATA>....x
FCT1 FCT2 FCT3 FCT4 FCT5 FCT6 FCT7 FCT8
```

FIG. 35

PROCEDURE: BILIRUBIN

```
USER:      <STAFF-ID>   mm/dd/yy      hh:mm AM
MOTHER:    <PATIENT-ID>               LOC:
PROCED:    <PROCEDURE>  PAT: <PATIENT NAME>
START TIME              .....<ITEM DATA>....
STOP TIME               .....<ITEM DATA>....
METER READING           .....<ITME DATA>....

FCT1 FCT2 FCT3 FCT4 FCT5 FCT6 FCT7 FCT8
```

FIG. 36

PROCEDURE: ACTIVITY

```
USER:      <STAFF-ID>   mm/dd/yy      hh:mm AM
MOTHER:    <PATIENT-ID>               LOC:
PROCED:    <PROCEDURE>  PAT: <PATIENT NAME>
ACTIVITY                .....<ITEM DATA>....

FCT1 FCT2 FCT3 FCT4 FCT5 FCT6 FCT7 FCT8
```

FIG. 37

PROCEDURE: CIRCUMCISION

```
USER:    <STAFF-ID>    mm/dd/yy    hh:mm AM
MOTHER:  <PATIENT-ID>              LOC:
PROCED:  <PROCEDURE>   PAT: <PATIENT NAME>
DATE                   .....<ITEM DATA>....
TIME                   .....<ITEM DATA>....
DOCTOR                 .....<ITEM DATA>....

FCT1  FCT2  FCT3  FCT4  FCT5  FCT6  FCT7  FCT8
```

FIG. 38

```
        RACE_LIST
220 XXX                                 5
        REPORT_LIST
221 XXX                                 21
        RESPIRATION_LIST
222 XXX                                 20
        ROOM_TEMP_LIST
223 XXX                                 11
        STOOL_COLOR_LIST
224 XXX                                 12
        STOOL_TYPE_LIST
225 XXX                                 1
        SYS_TASK_LIST
226 XXX                                 8
        WORK_LIST
227 XXX                                 0
        XXX
228 XXX                                 10
        X_LIST
229 XXX                                 6
        YES_NO_LIST
230 X_LIST                              2200

231 X_LIST                              2201
        X
232 YES_NO_LIST                         2003

233 YES_NO_LIST                         2003
        No
234 YES_NO_LIST                         2004
        Yes

End Of File found at 234 records.
```

FIG. 41-8

```
Dump of ITEMS.FIL:

#   Item Name                            Item Type
---  -----------------------------------  ---------
  1  ADD_RETRIEVE_LIST                    List
  2  ADD_RETRIEVE_SELECT                  Field
  3  CURRENT_TIME                         Field
  4  DAZE                                 Field
  5  FEEDING_LIST                         List
  6  GOODSYS                              File
  7  GOOD_SYS_KEY                         Field
  8  HEAD                                 File
  9  HEAD_DATE                            Field
 10  HEAD_SERIAL                          Field
 11  HEAD_TIME                            Field
 12  ITEM_LIST                            List
 13  ITEM_LIST_PTR                        Field
 14  ITEM_MAST                            File
 15  ITEM_NAME                            Field
 16  ITEM_NUMBER                          Field
 17  ITEM_NUM_DISPLAY                     Field
 18  ITEM_TYPE                            Field
 19  LDFSKJDFLSKJASDFLKJSDFA              Field
 20  MAINT_LIST                           List
 21  MAINT_SELECT                         Field
 22  PAT                                  File
 23  PAT_COLOR_LIST                       List
 24  PAT_DISCHARGE_FLAG                   Field
 25  PAT_FIRST_NAME                       Field
 26  PAT_LAST_NAME                        Field
 27  PAT_MOM_NUMBER                       Field
 28  PAT_NAME_LIST                        List
 29  PAT_NUMBER                           Field
 30  PAT_PORT_ARRAY                       Field
 31  PAT_ROOM_NUMBER                      Field
 32  PAT_SELECT                           Field
 33  PAT_SELECT_LIST                      List
 34  PROC_COPY_COUNT                      Field
 35  PROC_DET                             File
 36  PROC_DET_ENTRY                       Field
 37  PROC_LIST                            List
 38  PROC_MAST                            File
 39  PROC_NAME                            Field
 40  PROC_NUMBER                          Field
 41  PROC_NUM_DISPLAY                     Field
 42  RAW                                  File
 43  RAW_DATA                             Field
 44  RAW_SERIAL                           Field
 45  RAW_STAMP                            Field
 46  REPORT_LIST                          List
 47  STOOL_COLOR_LIST                     List
 48  STOOL_TYPE_LIST                      List
 49  SYS                                  File
 50  SYSTEM_SELECT                        Field
 51  SYST_PORT                            Field
 52  SYS_KEY                              Field
 53  SYS_PRT_DATE                         Field
 54  SYS_PRT_SHIFT                        Field
 55  SYS_REPORT                           Field
 56  SYS_SERIAL                           Field
 57  SYS_TASK_LIST                        List
 58  USER                                 File
 59  USER_CODE                            Field 60  USER_NAME                            Field
 61  USER_NUMB                            Field
 62  USER_PIN                             Field
 63  WORK_LIST                            List
 64  WORK_SELECT                          Field
 65  XLIST                                List
 66  YES_NO_LIST                          List
 67  YES_NO_SELECT                        Field End Of File found at 67 records.
```

FIG. 39

Dump of FIF.FIL:

| #  | Field Name         | File Name  | Ord | KT |
|----|--------------------|------------|-----|----|
| 1  | DELETEME           | NOGOOD     | 3   | 0  |
| 2  | GOOD_SYS_KEY       | GOODSYS    | 0   | 1  |
| 3  | HEAD_DATE          | HEAD       | 5   | 0  |
| 4  | HEAD_SERIAL        | HEAD       | 2   | 0  |
| 5  | HEAD_SERIAL        | RAW        | 1   | 3  |
| 6  | HEAD_TIME          | HEAD       | 6   | 0  |
| 7  | ITEM_LIST_PTR      | ITEM_MAST  | 4   | 0  |
| 8  | ITEM_NAME          | ITEM_MAST  | 2   | 0  |
| 9  | ITEM_NUMBER        | ITEM_MAST  | 1   | 1  |
| 10 | ITEM_NUMBER        | PROC_DET   | 3   | 0  |
| 11 | ITEM_NUMBER        | RAW        | 3   | 0  |
| 12 | ITEM_TYPE          | ITEM_MAST  | 3   | 0  |
| 13 | PAT_DISCHARGE_FLAG | PAT        | 7   | 0  |
| 14 | PAT_FIRST_NAME     | PAT        | 3   | 0  |
| 15 | PAT_LAST_NAME      | PAT        | 2   | 1  |
| 16 | PAT_MOM_NUMBER     | PAT        | 5   | 0  |
| 17 | PAT_NUMBER         | HEAD       | 1   | 0  |
| 18 | PAT_NUMBER         | PAT        | 1   | 1  |
| 19 | PAT_NUMBER         | SYS        | 2   | 0  |
| 20 | PAT_PORT_ARRAY     | PAT        | 6   | 0  |
| 21 | PAT_ROOM_NUMBER    | PAT        | 4   | 1  |
| 22 | PROC_COPY_COUNT    | PROC_MAST  | 3   | 0  |
| 23 | PROC_DET_ENTRY     | PROC_DET   | 2   | 0  |
| 24 | PROC_NAME          | PROC_MAST  | 2   | 1  |
| 25 | PROC_NUMBER        | GOODSYS    | 0   | 0  |
| 26 | PROC_NUMBER        | HEAD       | 3   | 2  |
| 27 | PROC_NUMBER        | PROC_DET   | 1   | 3  |
| 28 | PROC_NUMBER        | PROC_MAST  | 1   | 1  |
| 29 | PROC_NUMBER        | SYS        | 3   | 0  |
| 30 | RAW_DATA           | RAW        | 4   | 0  |
| 31 | RAW_STAMP          | RAW        | 2   | 0  |
| 32 | SYST_PORT          | GOODSYS    | 0   | 1  |
| 33 | SYS_KEY            | GOODSYS    | 1   | 1  |
| 34 | SYS_KEY            | SYS        | 0   | 1  |
| 35 | SYS_PORT           | SYS        | 4   | 0  |
| 36 | SYS_PRT_DATE       | SYS        | 0   | 0  |
| 37 | SYS_PRT_SHIFT      | SYS        | 0   | 0  |
| 38 | SYS_REPORT         | GOODSYS    | 0   | 1  |
| 39 | SYS_REPORT         | SYS        | 5   | 0  |
| 40 | SYS_SERIAL         | GOODSYS    | 0   | 1  |
| 41 | SYS_SERIAL         | SYS        | 7   | 0  |
| 42 | USER_CODE          | GOODSYS    | 0   | 1  |
| 43 | USER_CODE          | SYS        | 6   | 0  |
| 44 | USER_CODE          | USER       | 4   | 0  |
| 45 | USER_NAME          | GOODSYS    | 0   | 1  |
| 46 | USER_NAME          | SYS        | 0   | 0  |
| 47 | USER_NAME          | USER       | 3   | 0  |
| 48 | USER_NUMB          | GOODSYS    | 0   | 1  |
| 49 | USER_NUMB          | HEAD       | 4   | 0  |
| 50 | USER_NUMB          | SYS        | 1   | 0  |
| 51 | USER_NUMB          | USER       | 1   | 1  |
| 52 | USER_PIN           | USER       | 2   | 0  |

End Of File found at 52 records.

FIG. 40

```
Dump of LISTS.FIL:

#   List Name                          Value
 ---  ---------------------------------  -----
   1  ACTIVITY_LIST                       2061
        Active
   2  ACTIVITY_LIST                       2062
        Active c Stimulation
   3  ACTIVITY_LIST                       2065
        Irritable
   4  ACTIVITY_LIST                       2066
        Jittery
   5  ACTIVITY_LIST                       2064
        Lethargic
   6  ACTIVITY_LIST                       2063
        Non Reactive
   7  ADD_RETRIEVE_LIST                      3
        Add
   8  ADD_RETRIEVE_LIST                      3
        Enter
   9  ADD_RETRIEVE_LIST                      1
        Retrieve
  10  ADD_RETRIEVE_LIST                      1
        View
  11  FEEDING_LIST                        2009

12  FEEDING_LIST                        2005
        Breast
  13  FEEDING_LIST                        2006
        Formula
  14  FEEDING_LIST                        2010
        Other
  15  FEEDING_LIST                        2007
        Water
  16  HEAD_CHEST_SZ_LIST                  2801
        14 1/2 Inches
  17  HEAD_CHEST_SZ_LIST                  2800
        14 Inches
  18  HEAD_CHEST_SZ_LIST                  2803
        15 1/2 Inches
  19  HEAD_CHEST_SZ_LIST                  2802
        15 Inches
  20  HEAD_CHEST_SZ_LIST                  2805
        16 1/2 Inches
  21  HEAD_CHEST_SZ_LIST                  2804
        16 Inches
  22  HEAD_CHEST_SZ_LIST                  2807
        17 1/2 Inches
  23  HEAD_CHEST_SZ_LIST                  2806
        17 Inches
  24  HEAD_CHEST_SZ_LIST                  2808
        18 Inches
  25  ITEM_LIST                           1435
        Activity
  26  ITEM_LIST                           1301
        Age
  27  ITEM_LIST                           1202
        Bath Care
  28  ITEM_LIST                           1115
        Bath Given By
  29  ITEM_LIST                           1103
        Blood Pressure
  30  ITEM_LIST                           1304
```

FIG. 41-1

|    |           |                    |      |
|----|-----------|--------------------|------|
| 31 | ITEM_LIST | Blood Pressure LT  | 1305 |
| 32 | ITEM_LIST | Blood Pressure RT  | 1211 |
| 33 | ITEM_LIST | By Wheelchair      | 1114 |
| 34 | ITEM_LIST | Chest Size         | 1204 |
| 35 | ITEM_LIST | Circumcision Care  | 1420 |
| 36 | ITEM_LIST | Color              | 1410 |
| 37 | ITEM_LIST | Comments           | 1203 |
| 38 | ITEM_LIST | Cord Care          | 1423 |
| 39 | ITEM_LIST | Cyanotic           | 1201 |
| 40 | ITEM_LIST | Diaper Care        | 1001 |
| 41 | ITEM_LIST | Discharge Date     | 1002 |
| 42 | ITEM_LIST | Discharge Time     | 1210 |
| 43 | ITEM_LIST | Discharged To      | 1440 |
| 44 | ITEM_LIST | Doctor             | 1400 |
| 45 | ITEM_LIST | Done Date          | 1401 |
| 46 | ITEM_LIST | Done Time          | 1200 |
| 47 | ITEM_LIST | Feeding Care       | 1107 |
| 48 | ITEM_LIST | Feeding Type       | 1306 |
| 49 | ITEM_LIST | Fetal Hearttones   | 1209 |
| 50 | ITEM_LIST | Gentilia           | 1113 |
| 51 | ITEM_LIST | Head Size          | 1303 |
| 52 | ITEM_LIST | Height             | 1206 |
| 53 | ITEM_LIST | Infection Present  | 1406 |
| 54 | ITEM_LIST | Injection Location | 1108 |
| 55 | ITEM_LIST | Intake Total       | 1422 |
| 56 | ITEM_LIST | Jaundice           | 1112 |
| 57 | ITEM_LIST | Length             | 1307 |
| 58 | ITEM_LIST | Marital Status     | 1424 |
| 59 | ITEM_LIST | Meconium Staining  | 1403 |
| 60 | ITEM_LIST | Medications Name 1 | 1404 |
| 61 | ITEM_LIST | Medications Name 2 | 1405 |
|    |           | Medications Name 3 |      |

FIG.41-2

| | | |
|---|---|---|
| 62 | ITEM_LIST<br>Meter Reading | 1432 |
| 63 | ITEM_LIST<br>Navel | 1208 |
| 64 | ITEM_LIST<br>Patient Color | 1116 |
| 65 | ITEM_LIST<br>Plethoric | 1421 |
| 66 | ITEM_LIST<br>Pulse | 1101 |
| 67 | ITEM_LIST<br>Race | 1302 |
| 68 | ITEM_LIST<br>Respiration | 1102 |
| 69 | ITEM_LIST<br>Room Temperature | 1100 |
| 70 | ITEM_LIST<br>Sex | 1300 |
| 71 | ITEM_LIST<br>Shift | 1402 |
| 72 | ITEM_LIST<br>Skin | 1207 |
| 73 | ITEM_LIST<br>Start Time | 1430 |
| 74 | ITEM_LIST<br>Stool Color | 1110 |
| 75 | ITEM_LIST<br>Stool Type | 1106 |
| 76 | ITEM_LIST<br>Stop Time | 1431 |
| 77 | ITEM_LIST<br>Temperature | 1104 |
| 78 | ITEM_LIST<br>Temperature Care | 1205 |
| 79 | ITEM_LIST<br>Voiding Amount | 1109 |
| 80 | ITEM_LIST<br>Voiding Number | 1105 |
| 81 | ITEM_LIST<br>Weight | 1111 |
| 82 | LENGTH_LIST<br>16 1/2 Inches | 2701 |
| 83 | LENGTH_LIST<br>16 Inches | 2700 |
| 84 | LENGTH_LIST<br>17 1/2 Inches | 2703 |
| 85 | LENGTH_LIST<br>17 Inches | 2702 |
| 86 | LENGTH_LIST<br>18 1/2 Inches | 2705 |
| 87 | LENGTH_LIST<br>18 Inches | 2704 |
| 88 | LENGTH_LIST<br>19 1/2 Inches | 2707 |
| 89 | LENGTH_LIST<br>19 Inches | 2706 |
| 90 | LENGTH_LIST<br>20 1/2 Inches | 2709 |
| 91 | LENGTH_LIST<br>20 Inches | 2708 |
| 92 | LENGTH_LIST<br>21 1/2 Inches | 2711 |
| 93 | LENGTH_LIST | 2710 |

FIG. 41-3

|   |   |   |
|---|---|---|
|  | 21 Inches |  |
| 94 | LENGTH_LIST | 2712 |
|  | 22 Inches |  |
| 95 | MAINT_LIST | 173 |
|  | Item Maintenance |  |
| 96 | MAINT_LIST | 174 |
|  | Proc Detail Maint |  |
| 97 | MAINT_LIST | 172 |
|  | Proc Maintenance |  |
| 98 | MAINT_LIST | 171 |
|  | User Maintenance |  |
| 99 | MARITAL | 2073 |
|  | Divorced |  |
| 100 | MARITAL | 2071 |
|  | Married |  |
| 101 | MARITAL | 2075 |
|  | Other |  |
| 102 | MARITAL | 2072 |
|  | Single |  |
| 103 | MARITAL | 2074 |
|  | Widowed |  |
| 104 | MF_LIST | 2302 |
|  | Female |  |
| 105 | MF_LIST | 2301 |
|  | Male |  |
| 106 | NUMBER_LIST | 2600 |
|  | 0 |  |
| 107 | NUMBER_LIST | 2601 |
|  | 1 |  |
| 108 | NUMBER_LIST | 2602 |
|  | 3 |  |
| 109 | NUMBER_LIST | 2603 |
|  | 4 |  |
| 110 | NUMBER_LIST | 2604 |
|  | 5 |  |
| 111 | PAT_COLOR_LIST | 2049 |
| 112 | PAT_COLOR_LIST | 2044 |
|  | Cyanosis |  |
| 113 | PAT_COLOR_LIST | 2043 |
|  | Jaundice |  |
| 114 | PAT_COLOR_LIST | 2045 |
|  | Meconium Staining |  |
| 115 | PAT_COLOR_LIST | 2042 |
|  | Pallor |  |
| 116 | PAT_COLOR_LIST | 2041 |
|  | Plethoric |  |
| 117 | PAT_NAME_LIST | 2001 |
|  | Baby Boy |  |
| 118 | PAT_NAME_LIST | 2002 |
|  | Baby Girl |  |
| 119 | PAT_SELECT_LIST | 1 |
|  | Patient Name |  |
| 120 | PAT_SELECT_LIST | 3 |
|  | Patient Number |  |
| 121 | PAT_SELECT_LIST | 2 |
|  | Patient Room Number |  |
| 122 | PRINT_LIST | 2901 |
|  | 1 |  |
| 123 | PRINT_LIST | 2902 |
|  | 2 |  |
| 124 | PRINT_LIST | 2903 |
|  | 3 |  |

FIG. 41-4

| | | |
|---|---|---|
| 125 | PROC_LIST<br>1st Shift Assessment | 13 |
| 126 | PROC_LIST<br>2nd Shift Assessment | 14 |
| 127 | PROC_LIST<br>Activity | 21 |
| 128 | PROC_LIST<br>Baby Initial Assessment | 2 |
| 129 | PROC_LIST<br>Bilirubin | 20 |
| 130 | PROC_LI<br>Circumcision | 22 |
| 131 | PROC_LIST<br>Color | 19 |
| 132 | PROC_LIST<br>Comments Brief | 16 |
| 133 | PROC_LIST<br>Comments Extensive | 17 |
| 134 | PROC_LIST<br>Discharge Assessment | 4 |
| 135 | PROC_LIST<br>Feeding | 11 |
| 136 | PROC_LIST<br>First Bath | 18 |
| 137 | PROC_LIST<br>Medications | 15 |
| 138 | PROC_LIST<br>Mother Initial Assessment | 6 |
| 139 | PROC_LIST<br>Output | 12 |
| 140 | PROC_LIST<br>Patient Discharge | 1 |
| 141 | PROC_LIST<br>Vitals | 10 |
| 142 | RACE_LIST<br>Black | 2052 |
| 143 | RACE_LIST<br>Caucasian | 2051 |
| 144 | RACE_LIST<br>Hispanic | 2054 |
| 145 | RACE_LIST<br>Oriental | 2053 |
| 146 | RACE_LIST<br>Other | 2055 |
| 147 | REPORT_LIST<br>Daily Shift Report | 2103 |
| 148 | REPORT_LIST<br>Patient Chart Baby | 2102 |
| 149 | REPORT_LIST<br>Patient Chart Mother | 2101 |
| 150 | REPORT_LIST<br>Reports Complete | 2104 |
| 151 | RESPIRATION_LIST<br>30 | 2500 |
| 152 | RESPIRATION_LIST<br>31 | 2501 |
| 153 | RESPIRATION_LIST<br>32 | 2502 |
| 154 | RESPIRATION_LIST<br>33 | 2503 |
| 155 | RESPIRATION_LIST<br>34 | 2504 |
| 156 | RESPIRATION_LIST | 2505 |

FIG.41-5

| | | |
|---|---|---|
| 157 | RESPIRATION_LIST 35 | 2506 |
| 158 | RESPIRATION_LIST 36 | 2507 |
| 159 | RESPIRATION_LIST 37 | 2508 |
| 160 | RESPIRATION_LIST 38 | 2509 |
| 161 | RESPIRATION_LIST 39 | 2510 |
| 162 | ROOM_TEMP_LIST 40 | 2400 |
| 163 | ROOM_TEMP_LIST 70 | 2401 |
| 164 | ROOM_TEMP_LIST 71 | 2402 |
| 165 | ROOM_TEMP_LIST 72 | 2403 |
| 166 | ROOM_TEMP_LIST 73 | 2404 |
| 167 | ROOM_TEMP_LIST 74 | 2405 |
| 168 | ROOM_TEMP_LIST 75 | 2406 |
| 169 | ROOM_TEMP_LIST 76 | 2407 |
| 170 | ROOM_TEMP_LIST 77 | 2408 |
| 171 | ROOM_TEMP_LIST 78 | 2409 |
| 172 | ROOM_TEMP_LIST 79 | 2410 |
| 173 | STOOL_COLOR_LIST 80 | 2020 |
| 174 | STOOL_COLOR_LIST Black | 2022 |
| 175 | STOOL_COLOR_LIST Brown | 2021 |
| 176 | STOOL_COLOR_LIST Green | 2024 |
| 177 | STOOL_COLOR_LIST Meconium | 2023 |
| 178 | STOOL_COLOR_LIST Yellow | 2025 |
| 179 | STOOL_TYPE_LIST | 2030 |
| 180 | STOOL_TYPE_LIST Formed | 2032 |
| 181 | STOOL_TYPE_LIST Loose | 2033 |
| 182 | STOOL_TYPE_LIST Soft | 2031 |
| 183 | SYS_TASK_LIST Admit Patient | 120 |
| 184 | SYS_TASK_LIST Baby Initial Assessment | 121 |
| 185 | SYS_TASK_LIST Collect Patient Data | 110 |
| 186 | SYS_TASK_LIST Discharge Assessment | 190 |
| 187 | SYS_TASK_LIST Hello | 101 |

FIG. 41-6

| | | |
|---|---|---|
| 188 | SYS_TASK_LIST<br>Join with Portable Computer | 9002 |
| 189 | SYS_TASK_LIST<br>Mother Initial Assessment | 126 |
| 190 | SYS_TASK_LIST<br>NIS System Maintenance | 170 |
| 191 | SYS_TASK_LIST<br>Patient Discharge | 150 |
| 192 | SYS_TASK_LIST<br>Report Printer | 9001 |
| 193 | SYS_TASK_LIST<br>Signoff | 199 |
| 194 | SYS_TASK_LIST<br>User Inquiry | 180 |
| 195 | SYS_TASK_LIST<br>View Patient Data | 160 |
| 196 | WORK_LIST<br>Add | 3 |
| 197 | WORK_LIST<br>Change | 2 |
| 198 | WORK_LIST<br>Delete | 4 |
| 199 | WORK_LIST<br>Enter | 3 |
| 200 | WORK_LIST<br>Modify | 2 |
| 201 | WORK_LIST<br>Retrieve | 1 |
| 202 | WORK_LIST<br>Update | 2 |
| 203 | WORK_LIST<br>View | 1 |
| 204 | XXX<br>ACTIVITY_LIST | 18 |
| 205 | XXX<br>ADD_RETRIEVE_LIST | 19 |
| 206 | XXX<br>FEEDING_LIST | 9 |
| 207 | XXX<br>HEAD_CHEST_SZ_LIST | 24 |
| 208 | XXX<br>ITEM_LIST | 17 |
| 209 | XXX<br>LENGTH_LIST | 23 |
| 210 | XXX<br>MAINT_LIST | 7 |
| 211 | XXX<br>MARITIAL | 16 |
| 212 | XXX<br>MF_LIST | 14 |
| 213 | XXX<br>NUMBER_LIST | 22 |
| 214 | XXX<br>PAT_COLOR_LIST | 13 |
| 215 | XXX<br>PAT_NAME_LIST | 4 |
| 216 | XXX<br>PAT_SELECT_LIST | 2 |
| 217 | XXX<br>PRINT_LIST | 25 |
| 218 | XXX<br>PROC_LIST | 3 |
| 219 | XXX | 15 |

FIG. 41-7

INFORMATION RECORDING AND RETRIEVAL SYSTEM

A microfiche appendix including 3 microfiche covering 126 pages is part of the specification that will not be published.

BACKGROUND OF THE INVENTION

1. Field of the Invention

The present invention relates to a novel method and to a system for recording data items and for subsequent retrieval of the data items, particularly patient information and especially in the setting of a hospital nursery. In particular, the present invention relates to a method and system which utilized a hand held computer for data items recording and a host microcomputer to which the data items are transferred. A particular feature of the present invention is the use of the host microcomputer to load a hand held computer with data items which are displayed in a table or chart form in the hand held computer as part of the files for recording new data items. The table form in the hand held computer preferably includes previously recorded data items for comparative purposes adjacent to new data items being recorded which is especially useful in a hospital setting. After the data items are recorded they are transmitted to the host microcomputer for recreation of the table form of the hand held computer which can then be assembled into reports by programming in the host microcomputer.

2. Prior Art

The prior art has described systems for the collection of data items, particularly medical data items, using hand held units which are then linked for transmission of the data items to a host computer or microcomputer. Two patents describe such systems. The first is U.S. Pat. No. 3,566,365 to Rawson et al. This system has the following features:

(1) The system collects medical data items in a real-time environment for transmission to a central or host microcomputer. The total of the collected data items becomes the medical history.

(2) The data items are immediately available for review by the physician either on a visual display or in printed form from the host microcomputer. The data items are also retained for later retrieval.

(3) The data items collected are primarily "vitals" and demographic data items.

The primary problems with the system of Rawson et al include:

(1) Each data item collection station is configured to collect one or several specific pieces of information. Each station is not a general purpose collection point. The station unit is not programmable.

(2) The information is collected at a terminal at a station console and transmitted to the minicomputer using a data communications technique.

(3) The information collected does not cover a very broad variety of information.

(4) No security or audit capability is described.

Rawson et al is important because it collects medical data items and makes it available in real-time for review and collects a portion of the data items normally found on the patient's medical chart. The data items are used in a medical history and not in a patient chart or table of information. The system is intended for mass data collection and not for routine patient charting.

The second patent is U.S. Pat. No. 4,121,574 to Lester. This system includes the following features:

(1) The system measures and displays vital signs of the patient.

(2) The system utilizes a battery-operated portable collection device for gathering data. This device utilizes a digital readout for displaying the temperature and an alphanumeric display for patient information.

(3) The portable unit couples with the console to cause the data to be transferred and the batteries of the portable to be recharged.

(4) Collected data is printed at the console.

The primary system problems with Lester are:

(1) Each portable unit is designed to collect specific vital-sign data items. This unit is not programmable.

(2) The data items collected do not cover a wide variety of data items.

(3) No security or audit capability is described.

(4) The console described by Lester does not have an information assembly and reporting capability for the preparation of reports.

Lester is significant because it captures vital data in a portable device and transfers that data to a control unit while coupled with that unit. Both the portable and console devices utilize visual displays. The portable unit is not programmable and has no data entry keyboard. The data items that are collected are not the complete patient chart but only a portion thereof.

There are two patents which have apparatus which are related to the present invention. The first of these inventions is U.S. Pat. No. 4,143,417 to Wald et al. The following three points describe the disadvantages of Wald et al.

(1) The hand held unit has only a numeric keypad with limited display. An alphanumeric keyboard is necessary for patient charting.

(2) The hand held unit is not programmable.

(3) The system transmits data between the service module and a remote terminal in a data communications mode.

The second patent that utilizes a significant hardware design is U.S. Pat. No. 3,940,742 to Hudspeth et al. This patent describes:

(1) A system utilizing a portable, battery-powered device for collecting medical information. The information consists of pulse, respiration and temperature as well as other data. Although this latter feature is not specifically described in the patent; and (2) The portable unit is coupled with the printer to transfer the data.

The problems with the Hudspeth device include:

(1) The display subsystem is small. As will be seen, it is important that the visual display for charting have a minimum of 8 lines of 40 characters each. The display of Hudspeth appears to be a single line of approximately 12 characters.

(2) The Hudspeth portable hand held unit is not programmable.

(3) No permanent memory is provided in the Hudspeth system for retaining collected data items.

Hudspeth utilizes a portable device to collect vital signs and the data is printed and placed in the patient's chart. Hudspeth does not use a main computer to retain collected data or in the operation of the portable devices.

Other prior art patents which describe related systems and/or apparatus are 4,005,388; 4,364,112; 4,279,021; 4,216,462; 4,169,290; 4,125,871; 4,107,784;

4,090,247; 4,019,174; 4,007,443; 3,942,157; 3,956,740. None of these systems function in the manner of the present invention and are more remote from it than those specifically discussed.

OBJECTS

It is therefore an object of the present invention to provide an information recording and retrieval system, particularly for patients in a hospital type setting, including a hand held computer which is capable of providing a chart or table form for recording data items and preferably including prior recordings from an earlier time period in the table form programmed by a host microcomputer. This system is hereafter identified as PIRS (Patient Information and Retrieval System).

Further the present invention relates to the use of a hand held computer in the PIRS which is fully programmable and has a screen for the chart or table form of at least about eight lines and an alphanumeric keyboard with at least eight programmable function keys.

Further still, it is an object of the present invention to provide a PIRS which has provision for security and audit capability for the information.

Further the present invention relates to a PIRS which includes memory incorporated in the hand held computer which can be coupled to a host microcomputer for data item transfer. Further still, it is an object of the present invention to provide a PIRS with a communications link which can allow direct access to the memory of the hand held computer by the host microcomputer for data item transfer.

Further still it is an object of the present invention to provide the PIRS adapted for a hospital setting, particularly a nursery, for patient charting as a preferred table form, wherein the hand held computer is provided with charts for recording data items and the data items are periodically transferred to the host microcomputer to recreate the charts and to assemble the data items into reports.

These and other objects will become increasingly apparent by reference to the following description and the drawings.

IN THE DRAWINGS

FIG. 1 is a block diagram of the elements of the hand held computer of the present invention, particularly showing: (1) the hardware elements including a display, a keyboard, and a PC host memory interface or communications port in a microcomputer; and, (2) the memory stored software elements including the raw item data base, the item table, the procedure table and the user table. The computer program listings for the hand held computer software are included as Appendices hereto.

FIG. 2 is a block diagram of the host microcomputer elements showing: (1) the hardware elements including the display, the keyboard, the printer and the interface for linking to the hand held computer; and, (2) the memory stored software elements including patient file, the value file, the item table, the procedure table, the user table and the report table which are accessed by the PC host microprocessor.

FIGS. 3 to 19 show the various table forms which are used in the preferred nursery information system (NIS).

FIGS. 20 to 38 show the screens on the hand held computer in the preferred NIS.

FIGS. 39 to 41 show the fields and files for the host microcomputer.

GENERAL DESCRIPTION

Broad Method and System

Figure 1:
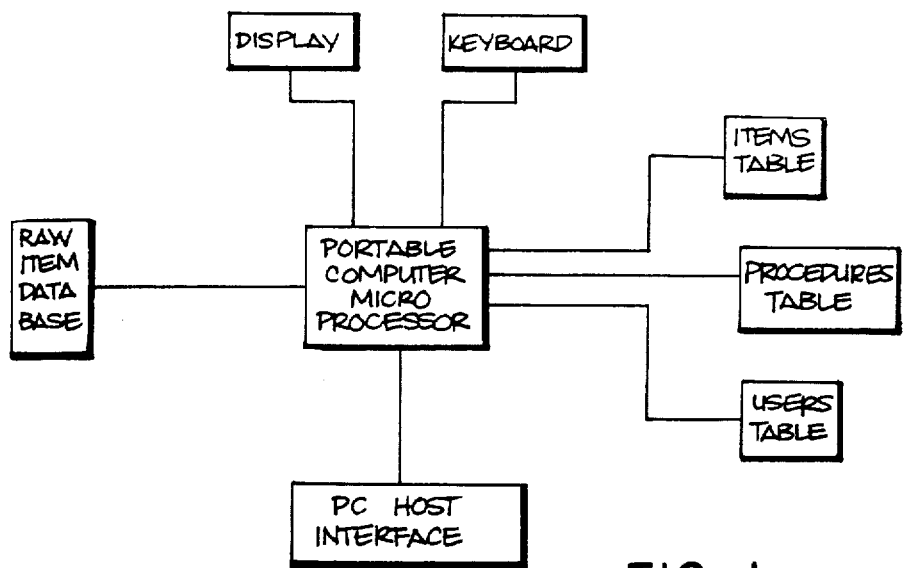

The present invention relates to a method for providing data items in a host microcomputer with a screen, printer or other visual display means for displaying the data items in table form, wherein the data is collected by user personnel which comprises:

(a) providing a first host microcomputer with a first visual display means and a first memory interface controlled by a first microprocessor including first data item entry means to the first microprocessor;

a second portable hand held computer having a second memory interface controlled by a second microprocessor including second data item entry means to the second microprocessor and a second visual display means for showing data items in table form;

a communication link means for communication between the first and second memory interfaces;

a first program in the host computer which transfers data items in table form to the hand held computer upon command for assembly into table form in the hand held computer, wherein the host microcomputer is programmed to produce table forms including procedures and lines for data items to be collected and for user identification codes for authorized users; and a second program in the hand held computer which collects data items in the table form using the second data entry means wherein the data items are transferred when linked with the host computer by the communication link means and memory interfaces;

(b) collecting through user personnel the data items in the hand held computer using the second data entry means;

(c) running the second program in the hand held computer and the first program in the host microcomputer to transfer the data items to the host microcomputer by the communications link means and memory interfaces and to thereby empty the hand held computer of all data items;

(d) running the second program in the hand held computer and the first program in the host microcomputer to receive data items through the communication link means; and (e) running the first program in the host microcomputer to produce reports based upon the data items in the host microcomputer for visualization on the display means, wherein the data items transferred to the hand held computer varies over time according to varying information to be collected and user personnel.

The present invention also relates to a system for providing data items in a host computer with a screen, printer or other visual display means for displaying the data items in table form, wherein the data items are collected by user personnel which comprises:

(a) a first host microcomputer with a first visual display means and a first memory interface controlled by a first microprocessor including first data item entry means to the first microprocessor;

(b) a second portable hand held computer having a second memory interface controlled by a second microprocessor including second data item entry means to the second microprocessor and a second visual display means for showing data items in table form;

(c) a communication link means for communication between the first and second memory interfaces;

(d) a first program in the host computer which transfers data items in table form to the hand held computer upon command for assembly into table form in the hand held computer, wherein the host microcomputer is programmed to produce table forms procedures and lines for data items to be collected and for user identification codes for authorized users; and (e) a second program in the hand held computer which collects data items in the table form using the second data item entry means wherein the table forms are transferred to the hand held computer when linked with the host computer by the communication link means and memory interfaces, wherein the data items are collected through user personnel in the hand held computer using the second data item entry means, wherein the second program is run in the hand held computer and the first program is run in the host microcomputer to transfer the data items to the host microcomputer by the communications link means and memory interfaces and to thereby empty the hand held computer of all data items;

wherein the second program is run in the hand held computer and the first program in the host microcomputer to receive the data items through the communication link means; and wherein the first program is run in the host microcomputer to produce reports based upon the data items in the host microcomputer for visualization on the display means, wherein the data items transferred to the hand held computer varies over time according to varying information to be collected and user personnel.

Specific Method and System

The present invention relates to a method for providing medical patient data items in a host microcomputer with a screen, printer or other visual display means for displaying the data in table or chart form, wherein the patient data items are collected by user personnel which comprises:

(a) providing a first host microcomputer with a first visual display means and a first memory interface controlled by a first microprocessor including first data item entry means to the first microprocessor;

a second portable hand held computer having a second memory interface controlled by a second microprocessor including second data item entry means to the second microprocessor and a second visual display means for showing patient data items in table form;

a communication link means for removable interconnection between the first and second memory interfaces;

a first program in the host microcomputer which transfers a first subset of previously collected and assembled patient data items to the hand held computer, upon command for assembly into table form in the hand held computer, wherein the host microcomputer is programmed to produce table forms including procedures and lines for data items to be collected and for user codes for authorized users; and a second program in the hand held computer which collects a second subset of patient data in the table form using the second data entry means wherein the patient data in the second subset is related to the patient first subset of data and which second program when linked with the host microcomputer by the communication link means and memory interfaces transfers the second subset of patient data items to the host microcomputer;

(b) collecting through user personnel the second subset of patient data in the hand held computer using the second data item entry means and comparing the second subset of patient data to the first subset of patient data on the second visual display means for immediately determining the health of the patient;

(c) running the second program in the hand held computer and the first program in the host microcomputer to transfer the second subset of patient data items to the host microcomputer by the communications link means and memory interfaces and to thereby empty the hand held computer of all patient data items;

(d) running the second program in the hand held computer and the first program in the host microcomputer to receive the first subset of patient data items in the hand held computer through the communication link means; and (e) running the first program in the host microcomputer to produce reports based upon the first or second subset or both patient data items in the host microcomputer for visualization on the display means, wherein the first subset of patient data items transferred to the hand held computer varies over time according to varying patients and user personnel.

Further, the present invention relates to a system for providing medical patient data items in a host computer with a screen, printer or other visual display means for displaying the data items in table or chart form, wherein the patient data items are collected by user personnel which comprises:

(a) a first host microcomputer with a first visual display means and a first memory interface controlled by a first microprocessor including first data item entry means to the first microprocessor;

(b) a second portable hand held computer having a second memory interface controlled by a second microprocessor including second data item entry means to the second microprocessor and a second visual display means for showing patient data items in table form;

(c) a communication link means for removable interconnection between the first and second memory interfaces;

(d) a first program in the host microcomputer which transfers a first subset of previously collected and assembled patient data items to the hand held computer upon command for assembly into table form in the hand held computer, wherein the host microcomputer is programmed to produce table forms including procedures and lines for data items to be collected and for user codes for authorized users; and (e) a second program in the hand held computer which collects a second subset of patient data in the table form using the second data entry means wherein the patient data in the second subset is related to the patient data first subset and which second program when linked with the host computer by the communication link means and memory interfaces transfers the second subset of patient data to the host microcomputer, wherein the second subset of patient data items is collected through user personnel in the hand held computer using the second data item entry means and with a comparison of the second subset of patient data items to the first subset of patient data items on the second visual display means for immediately determining the health of the patient, wherein the second program is run in the hand held computer and the first program is run in the host microcomputer to transfer the second subset of patient data items to the host microcomputer by the communications link means and memory interfaces and to thereby empty the hand held computer of all patient data items;

wherein the second program is run in the hand held computer and the first program in the host microcomputer to receive the first subset of patient data items in the hand held computer through the communication link means; and wherein the first program is run in the host microcomputer to produce reports based upon the first or second subset or both patient data items in the host microcomputer for visualization on the display means, wherein the first subset of patient data items transferred to the hand held computer varies over time according to varying patients and user personnel.

In the present invention the hand held computer functions as an extension of the host microcomputer. The result is direct access to the memory contained in the hand held computer and transfer for unloading of the data items to the host computer.

Specific Description

Figure 2:
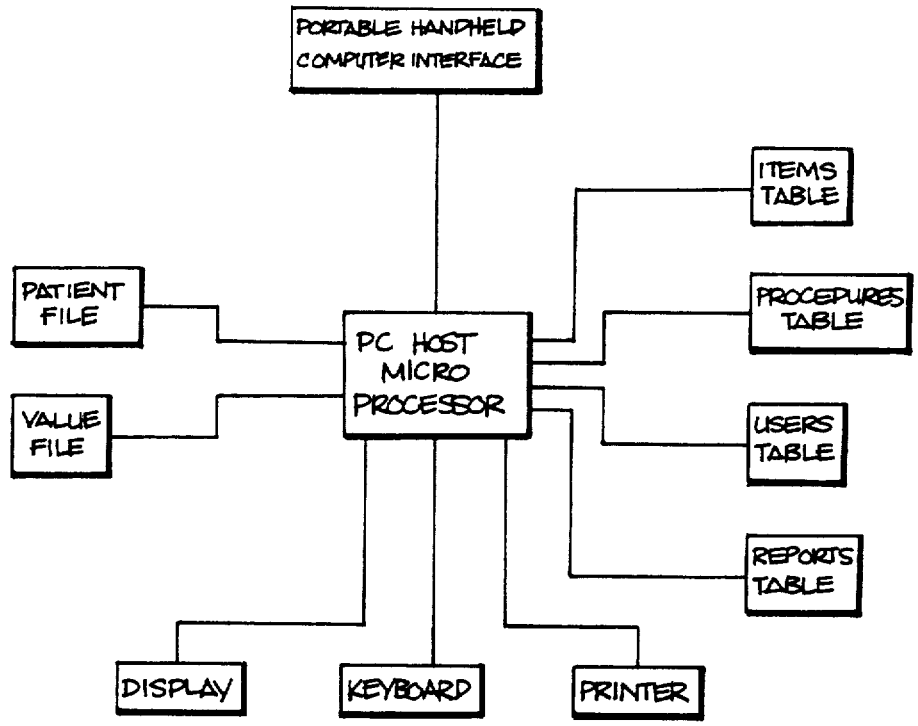

The following description is organized into the three major sections of FUNCTIONAL SPECIFICATION, MECHANICAL COMPONENTS and LOGICAL STRUCTURE. These, as a group, provide a general description of PIRS in a hospital setting, particularly a nursery. PIRS is shown in FIGS. 1 and 2.

The logical interconnection of the involved microcomputers in the host and hand sized computers utilizes data structures or programs (see Appendices) which have been customized for this purpose. The most notable feature of PIRS is the elimination of the manual handling of any patient data items once entered into a hand held computer. This mechanization of the laborious, time consuming, redundant and error prone facets of manual patient charting is the most important overall characteristic of the PIRS.

The software or programs for the PIRS uses commercially available hardware components. The PIRS programs can reside in permanently programmed Read Only Memory (ROM), and the system logic would therefore take on some of the characteristics of hardware.

FUNCTIONAL SPECIFICATION

PIRS is a computer system installed in a hospital setting such as an obstetric unit to manage the patient charting function for the well newborn and post-partum mother. The Nursery Information System (NIS) is a specific preferred embodiment of the PIRS.

In the present invention, patient data items are entered into the hand held computer system directly by the user in real time. Subsequent manipulation of this information is automated to produce the desired reports and summaries for those requesting them without further manual manipulation of individual patient data items. This contrasts with the conventional manual collection method where patient data items after charting are frequently transcribed from one report to another in order that the required reference and report formats be available. Besides being redundant and time consuming, this manual manipulation of patient data items increases the likelihood of human error during some manipulation.

PIRS stores patient information in a centrally located host microcomputer. This computer functions as the central component of the system, coordinating all access to the patient data item base. Professional staff collecting patient data items are equipped with hand held computers which have been programmed to collect information on individual patients in a chart or table form. The data items are requested by the hand held computer in a manner which duplicates the order and manner of the manual collection process, so that the addition of an automated device into the process does not interfere with the normal charting routine.

Patient data items are collected from multiple patients over an interval of time and are then transferred to the central host microcomputer from many different hand held computers. The information from multiple hand held computers is thus integrated with the existing patient data items in the host microcomputer and immediately available for review and for the preparation of printed reports by the host microcomputer. After transferring collected data items to the host microcomputer, each hand held computer has transferred to it a subset of updated patient data items. The hand held computer is then suitably prepared to continue the collection process. During data item collection, the user of the portable hand held computer may review the patient data items transferred to the portable hand held computer by the host microcomputer in addition to information collected for comparative purposes.

In order that patient records retain the validity and security superior to manually written system, entries in either computer are protected from accidental or purposeful alteration. Once a data item has been entered into the hand held computer and accepted by the user, it may not be altered in any manner by anyone at anytime. If a data item is subsequently determined to be incorrect, the correct data item must be entered in addition to the incorrect data item. Appropriate explanations may also be entered as desired or required. All data items entered are time and date coded.

The PIRS is programmed to produce reports on individual patients which, at minimum, duplicate functionally the manually prepared reports available previous to the PIRS. These reports can be reviewed on the display screen of the host microcomputer or can be printed on paper as a permanent record by a printer connected to the host microcomputer. When so requested, the PIRS can produce a customized set of report formats which are required for the permanent patient record. This request usually occurs at patient discharge and is part of the normal process of transferring the permanent patient record from the PIRS to the hospital's records archive. This transfer of records from the PIRS physically releases the patient's records which are no longer retained in the PIRS. The physical space in the host microcomputer memory consumed by those records is thus released and is available for the storage of new patient records.

MECHANICAL COMPONENTS

The PIRS includes a microcomputer the equivalent of an IBM PC/XT TM and one or more hand held computers equivalent to a Radio Schack TRS 80 Model 100 TM or Nippon Electric TM (NEC) PC8201. The preferred host computer microprocessor is composed of an Intel 8088 microprocessor with 512,000 or more characters of high speed semiconductor memory, two disk drives, a keyboard and 1,920 character, monochrome video display. One disk is a 10,000,000 character permanent rigid disk; the other disk is flexible disk drive which accepts industry standard 5.25 inch flexible disks, each capable of storing 320,000 characters for data items. Additionally, the microprocessor is equipped with a memory interface for connection with the hand held computer and a medium speed, dot-matrix, character printer for the preparation of hard copies.

The TRS-80 Model 100 TM and NEC PC8201 hand held computers contain an Intel 8085 microprocessor with between 32,000 and 96,000 characters of high speed semiconductor memory, a keyboard, a 40 character, 8 line, monochrome liquid crystal display, and a memory interface for communication with the host microcomputer.

During normal data item collection and reporting functions, the hand held computer and host microcomputer operate independently. However, when information is being transferred between the two computers they are connected with a communication link means that utilizes an RS232 cable. Other communications systems can be used such as radio between the host computer and the hand held computer.

LOGICAL COMPONENTS

HOST COMPUTER

The PIRS logic itself and the patient data items are organized into FILEs on the host microcomputer. Each FILE contains data items and is organized in such fashion as to allow the most efficient production of the charting process. The data item positioning conforms to generally accepted hospital practices for data organization in charting.

PATIENT FILE

The PATIENT FILE contains static (non-changing) data items for each PATIENT such as name and room number. These data items are collected one time only and do not normally change.

VALUE FILE

All information data items collected (ITEMS) are stored, one per record, in the VALUE FILE. Each ITEM is recorded along with identification information, which allows it to be associated with the correct patient, date, time and staff person responsible for the entry. This is referenced as security or audit trail information.

REPORT PROCESSOR

The REPORT PROCESSOR is responsible for the production of printed reports, as they are requested by USER.

REPORT DEFINITION

The REPORT DEFINITIONs contain specifications which define reports which are required by the hospital or staff for operational use of the PIRS. The specifications are used to determine which data items from the VALUE FILE for the patient are to be considered for REPORTs, and the format of each REPORT. These reports can vary by specific hospital. REPORT DEFINITIONS are used to process the patient data items and produce reports the contents of which may be reviewed on the host microcomputer display and printed on paper by the printer attached to the host microcomputer.

INTERFACE PROCESSOR

The INTERFACE PROCESSOR controls the flow of information between the HOST microcomputer and HAND HELD computer. It is responsible for the establishment of the communication link (LINK) to a HAND HELD computer, the acceptance and disposition of data ITEMs taken from the HAND HELD, identification of data ITEMs to be transferred to the HAND HELD, transmission of those data items and termination of the LINK. The docking process causes the interface processor to function.

CONTROL MODULE

The CONTROL MODULE is the operational program which executes within HOST microcomputer in order that the defined application be accomplished. When not otherwise occupied by a previously requested task, the CONTROL MODULE awaits input from a USER through the KEYBOARD of the HOST computer. The COMMAND entered by the USER is evaluated and acted upon.

Valid COMMANDs cause a pre-defined set of events to take place. These involve the manipulation of the information which is present in the various FILEs and TABLEs. These COMMANDs include the following functions:

ADD, CHANGE, DELETE, or RETRIEVE any ITEM, PROCEDURE, USER, or REPORT (TABLE entries)

These COMMANDS are associated together as a group of MAINTENANCE COMMANDs due to the nature of their function, which is oriented more toward the control of the structures of the PIRS rather than the control of PIRS patient data items. As such, the MAINTENANCE COMMANDs are reserved for the use of a trained PIRS systems analyst.

Another group of COMMANDs are the OPERATIONAL COMMANDS. These commands provide the USER of the PIRS with functions which are the mandate of the PIRS.

The host microcomputer is supported by MS DOS or some other suitable operating system program. The application is defined using and executed by way of a proprietary application development system referred to as DOODLE TM, and is currently available from Technology Venture Management, Inc. (TVM), 900 Long Boulevard, Suite 209, Lansing, Mich. 48910. DOODLE TM is in the class of application development system packages which are known in the prior art but which are much less sophisticated. DOODLE TM creates application systems without the use of procedural source language programming. Rather, DOODLE TM consists of integrated development tools that are menu driven and create information tables. These tables are interpreted in a real-time environment to guide the collection and retrieval of data.

An application system is created by completing the following tasks with the assistance of DOODLE. The application developer begins by creating the data dictionary. This task also includes the generation of the data base on the host microprocessor using the data dictionary. The second task is to create the table forms to be used in the operating environment by describing the layout of the data on the video display and the rules associated with the processing of the data. These rules include minimum and maximum numeric values, calculations, error processing and default values. The third task is to integrate the data base and the table forms to create a "program". Unlike procedural source language programs such as COBOL no compilation process is required to create an object program which would be executed to run the application. Thus, no compiled listings of programs are available for inspection. The final task is for DOODLE to interpret the rules associated with each form (the "program") and to apply those rules in the storage and retrieval of data associated with the application.

HAND HELD COMPUTER

The HAND HELD computer operates on the PATIENT FILE and data items table forms which are organized in a fashion similar to that of the HOST computer. The major organizational difference is that static PATIENT FILE data items are treated in a manner similar to all other data ITEMs collected, with the exception that it is not collected more than once. The HOST microcomputer transfers a first subset of data items to the HAND HELD unit which formats them in table form for entry of a second subset of data items.

RAW DATA BASE

All PATIENT data ITEMs collected in the hand held computer are maintained in the RAW DATA BASE which contains one entry per data ITEM collected with security and audit trail information included with each.

Data ITEMs transferred to the HAND HELD computer by the HOST computer are also maintained there so that they may be available for review upon the request of the USER.

CONTROL STRUCTURES

Programs direct the HAND HELD computer in the manipulation of the various data item structures defined into table forms. These key structures are the ITEM TABLE, PROCEDURE TABLE, and USER TABLE.

DATA ITEM TABLE

DATA ITEMs that are to be collected are defined by the data item headings in the DATA ITEM TABLE. Each data ITEM heading definition contains the specification of such details as the prompting text to be used when requesting a given data ITEM from the USER, what data types are acceptable in response, and how the response data is to be organized in the RAW ITEM DATA BASE.

PROCEDURE TABLE

The USER specifies that a PROCEDURE be executed when data collection is desired. Each PROCEDURE definition includes PROCEDURE NAME and a list of DATA ITEMs and PROCEDUREs that comprise the particular PROCEDURE. This structure permits the flow of data item collection to be very specifically defined in order that it conform to the normal flow of data item gathering practiced by the hospital prior to the installation of the PIRS.

USER TABLE

Professional staff who use the PIRS are known to the PIRS by a unique identification name (USERID) and a confidential Personal Identification Number (PIN). Each USER will enter their USERID and PIN in order to gain access to the PIRS. The USERID uniquely identifies each staff person and this USERID is carried with all information entered by the USER.

When a particular USER finishes using a HAND HELD computer, LOGOUT processing suspends the PIRS in that HAND HELD computer until another USER is identified to the PIRS by successfully entering a valid USERID and PIN.

The use of a USERID and PIN pair is the logical equivalent of the individual's initials or signature on information entered and, thus, a USER's PIN should be considered highly confidential by the USER holding that USERID/PIN pair.

NURSERY USE OF PIRS

The preferred PIRS is designed as a computer assisted charting system for the well baby nursery (NIS). Basic computer assisted charting is initiated by the input of selected data items obtained from hard copy records created during labor and delivery. The general data items needed to initialize the system consist of infant identification information and observations of specific risk factors present at birth.

The process of charting data items begins in the transition nursery by the recording of the nurse's initial assessment of the baby. This assessment is a comprehensive physical examination of the infant, including vital signs and any abnormalities of the skin, head, eyes, ears, nose, mouth, chest, abdomen, genitalia, extremities and reflexes. In the event that a delay occurs in the transfer of a patient record from labor and delivery to the nursery, a specific baby may not be entered into the NIS at the time the initial assessment is completed. The system is designed to accommodate such an occurrence.

Computer assisted charting continues after the initial assessment by recording the flow record in the transition and well baby nurseries. Flow record charting includes the documentation of routine observations of the infant such as vital signs, activity, crying, skin color, intake/output, and care provided for cord and eyes. The baby flow record observations in some hospitals may be made in the mother's room, which necessitates that portable hand held computers be part of the system.

At or during the discharge preparation a nurse's final assessment of the infant's physical condition is completed. This assessment is similar in format to the initial physical assessment. The NIS provides computerized assistance during the discharge. Finally, the NIS is capable of providing customized printed reports detailing the assessments, nursery flow records or abstracted data items whenever desired by authorized personnel.

The NIS concept also includes:

(1) Provision for charting the medication record and laboratory test results in the transition and well baby nurseries. These data items are to be input to the system from hard copy records.

(2) Charting of mothers while in the postpartum unit.

(3) Capability for each hospital to use the host microcomputer for any information purpose it may deem useful. For example, this capacity can be used to develop nursing care plans, write work schedules, vacation schedules, etc.

In addition, the NIS design allows integration of this system with other computer hardware and software so that it can serve as one component of a total hospital information system.

Figure 4:
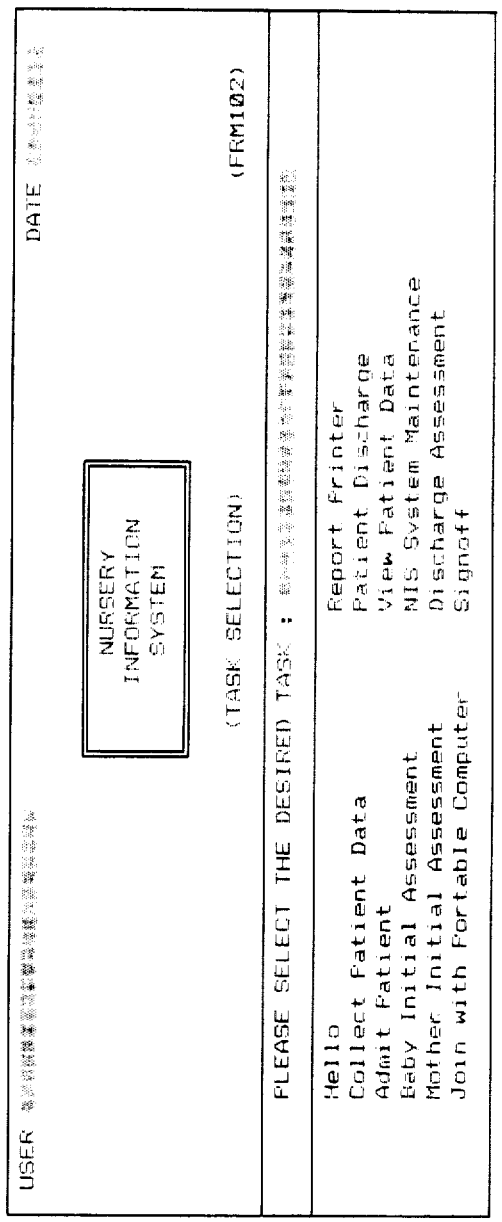
Figure 6:
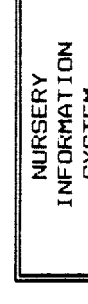
Figure 19:
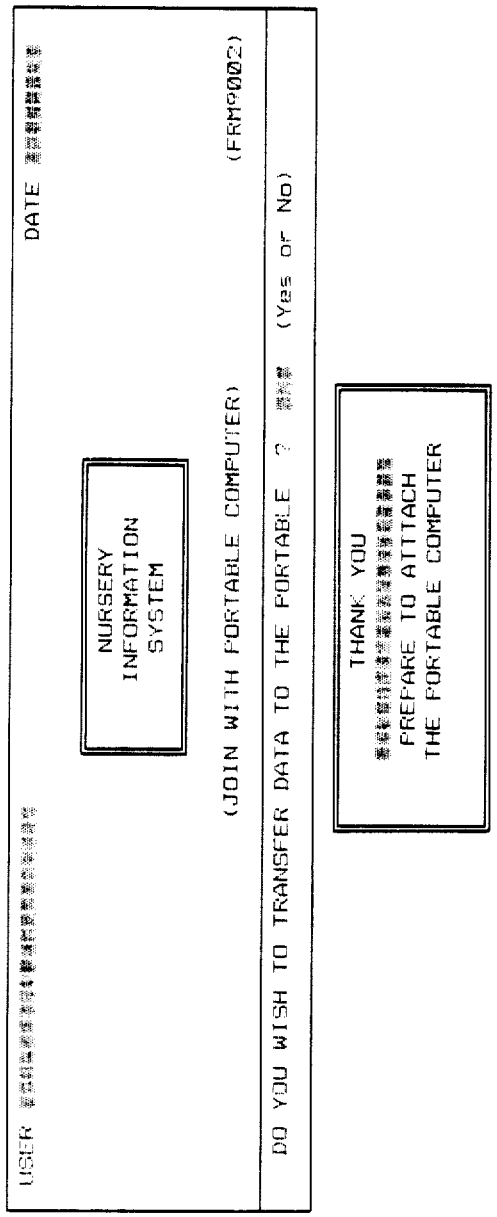

The following are the screens on the host microcomputer:

| | | Form No. |
|---|---|---|
| HELLO | FIG. 3 | 101 |
| COLLECT PATIENT DATA | FIG. 5 | 110 |
| ADMIT PATIENT | FIG. 6 | 120 |
| BABY INITIAL ASSESSMENT | FIG. 7 | 121 |
| MOTHER INITIAL ASSESSMENT | FIG. 8 | 126 |
| JOIN WITH PORTABLE COMPUTER | FIG. 19 | 9002 |
| REPORT PRINTER | FIG. 18 | 9001 |
| PATIENT DISCHARGE | FIG. 9 | 150 |
| VIEW PATIENT DATA | FIG. 10 | 160 |
| NIS SYSTEM MAINTENANCE | FIG. 11 | 170 |
| USER MAINTENANCE | FIG. 12 | 171 |
| PROCEDURE MAINTENANCE | FIG. 13 | 172 |
| ITEM MAINTENANCE | FIG. 14 | 173 |
| PROCEDURE DETAIL MAINTENANCE | FIG. 15 | 174 |
| DISCHARGE ASSESSMENT | FIG. 16 | 190 |
| SIGNOFF | FIG. 17 | 199 |
| TASK SELECTION | FIG. 4 | 102 |

FIGS. 20 to 38 show the screens on the hand held computer.

PORTABLE HAND HELD PROCEDURE SCREENS

The preferred portable hand held computer utilizes a visual display of 8 lines of 40 characters each. The screen is formatted in the following manner:

Lines 1, 2 and 3 identify the operating environment by displaying user identification, date, time, mother's identification (if patient is a newborn), room location, current procedure and patient identification.

Lines 4, 5, 6 and 7 comprise a window area used to collect and review data. This window functions by scrolling within the procedure (x's) to be collected. Line 4 displays the data most recently collected. Line 5 displays the field for which data is currently being collected. Lines 6 and 7 display the fields which will next be addressed. After each item's data is collected, the window scrolls up one line with the cursor remaining on line 5.

Line 8 displays the values associated with eight programmable function keys. The values are formatted in eight packets of five characters each on the forty character line. The function key values are associated with the item and thus change for each item of data collected.

Because the procedures to be performed often include more than four items of data, the screen formats are more than eight lines long. In operation, the display will conform to the description above.

FIGS. 39, 40 and 41 define the data item fields used within the system. Together they are the data dictionary elements of the NIS. FIG. 39 identifies each data element of the system and the logical type of that element. FIG. 40 lists those data elements (Field Name) that are associated with each physical file used in NIS. It also provides the ordering (Ord) of the fields within the file. FIG. 41 depicts the lists used by NIS. The options of each list are shown as well as the value that is associated with that option. The value is the data that is stored in the VALUE file (RAW) to represent the option selected.

The following are Appendices of programs deposited in the Patent and Trademark Office pursuant to CFR 1.96.

| | Name | Description |
|---|---|---|
| 1 | ROMKBD | pascal interface to rom keyboard routines |
| 2 | NGLOBAL | declarations of global vars |
| 3 | NCONST | declarations of constants |
| 4 | NISINI | replaces pascal initialization |
| 5 | ROMCOM | pascal interface to rom communication routines |
| 6 | TOGS | standard nis compiler toggles |
| 7 | ROMSRN | pascal interface to rom screen routines |
| 8 | ROMFKY | pascal interface to function key rom routines |
| 9 | ROMMISC | pascal interface to misc. rom routines |
| 10 | TBLADD | table manipulation routines |
| 11 | NISYINIT | system initialization routine |
| 12 | INPITEM | input active line routine |
| 13 | LOGGER | source to logger routines |
| 14 | NISWIN | window manipulation routines |
| 15 | DOWNLDR | downloader program (early) |
| 16 | COMTEST | used to test communication |
| 17 | GETFUNKY | get function keys routine |
| 18 | NISLIO | logical IO routines |
| 19 | IDPATN | id patient item processor |
| 20 | DISPMASK | display form mask |
| 21 | NISDRIV | test driver |
| 22 | DUMROM | dummy rom routines for testing in CPM environment |
| 23 | DOWNLD | source to current download program |
| 24 | DISPFLDS | display fields |
| 25 | NISSTACK | procedure stack manipulation routines |
| 26 | PROCSEL | procedure selection item processor |

I claim:

1. A method for providing data items in a host microcomputer with a screen, printer or other visual display means for displaying the data items in table form, wherein the data is collected by user personnel which comprises:

(a) providing a first host microcomputer with a first visual display means and a first memory interface controlled by a first microprocessor including first data item entry means to the first microprocessor;

a second portable hand held computer having a second memory interface controlled by a second microprocessor including second data item entry means to the second microprocessor and a second visual display means for showing data items in table form;

a communication link means for communication between the first and second memory interfaces;

a first program in the first host microcomputer which transfers data items in table form to the hand held computer upon command for assembly into table form in the hand held computer, wherein the host microcomputer is programmed to produce table forms including procedures and lines for data items to be collected and for user identification codes for authorized users; and a second program in the hand held computer which collects data items in the table form using the second data entry means wherein the data items are transferred when linked with the first host microcomputer by the communication link means and memory interfaces;

(b) collecting through user personnel the data items in the hand held computer using the second data entry neans;

(c) running the second program in the hand held computer and the first program in the host microcomputer to transfer the data items to the host microcomputer by the communications link means and memory interfaces and to thereby empty the hand held computer of all data items;

(d) running the second program in the hand held computer and the first program in the host microcomputer to receive data items through the communication link means; and (e) running the first program in the host microcomputer to produce reports based upon the data items in the host microcomputer for visualization on the display means, wherein the data items transferred to the hand held computer varies over time according to varying information to be collected and user personnel.

2. A system for providing data items in a host computer with a screen, printer or other visual display means for displaying the data items in table form, wherein the data items are collected by user personnel which comprises:

(a) a first host microcomputer with a first visual display means and a first memory interface controlled by a first microprocessor including first data item entry means to the first microprocessor;

(b) a second portable hand held computer having a second memory interface controlled by a second microprocessor including second data item entry means to the second microprocessor and a second visual display means for showing data items in table form;

(c) a communication link means for communication between the first and second memory interfaces;

(d) a first program in the host micro computer which transfers data items to the hand held computer upon command for assembly into table form in the hand held computer, wherein the host microcomputer is programmed to produce table forms including procedures and lines for data items to be collected and for user identification codes for authorized users; and (e) a second program in the hand held computer which collects data items in the table form using the second data item entry means wherein the table forms are transferred to the hand held computer when linked with the host computer by the communication link means and memory interfaces wherein, the data items are collected through user personnel in the hand held computer using the second data item entry means wherein the second program is run in the hand held computer and the first program is run in the host microcomputer to transfer the data items to the host microcomputer by the communications link means and memory interfaces and to thereby empty the hand held computer of all data items;

wherein the second program is run in the hand held computer and the first program in the host microcomputer to receive the data items through the communication link means; and wherein the first program is run in the host microcomputer to produce reports based upon the data items in the host microcomputer for visualization on the display means, wherein the data items transferred to the hand held computer varies over time according to varying information to be collected and user personnel.

3. A method for providing medical patient data items in a host microcomputer with a screen, printer or other visual display means for displaying the data in table or chart form, wherein the patient data items are collected by user personnel which comprises:

(a) providing a first host computer with a first visual display means and a first communications port controlled by a first microprocessor including first data item entry means to the first microprocessor;

a second hand held computer having a second communications memory interface controlled by a second microprocessor including second data item entry means to the second microprocessor and a second visual display means for showing patient data items in table form;

a communication link means for removable interconnection between the first and second memory interface;

a first program in the host microcomputer which transfers a first subset of previously collected and assembled patient data items to the hand held computer upon command for assembly into table form in the hand held computer, wherein the host microcomputer is programmed to produce table forms including procedures and lines for data items to be collected and for user codes for authorized users; and a second program in the hand held computer which collects a second subset of patient data in table form using the second data entry means wherein the patient data in the second subset is related to the patient data first subset and which second program when linked with the host computer by the communication link means and memory interfaces transfers the second subset of patient data items to the host computer;

(b) collecting through user personnel the second subset of patient data in the hand held computer using the second data item entry means and comparing the second subset of patient data to the first subset of patient data on the second visual display means for immediately determining the health of the patient;

(c) running the second program in the hand held computer and the first program in the host microcomputer to transfer the second subset of patient data items to the host microcomputer by the communications link means and memory interfaces and to thereby empty the hand held computer of all patient data items;

(d) running the second program in the hand held computer and the first program in the host microcomputer to receive the first subset of patient data items in the hand held computer through the communication link means; and (e) running the first program in the host microcomputer to produce reports based upon the first or second subset or both patient data items in the host microcomputer for visualization on the display means, wherein the first subset of patient data items transferred to the hand held computer varies over time according to varying patients and user personnel.

4. The method of claim 3 wherein the first computer program in the host microcomputer is an application development system program.

5. The method of claim 4 wherein the second computer program in the hand held computer includes the programs ROMKBD for a pascal interface to rom keyboard routines, ROMCOM for a pascal interface to rom communications routines, ROMSRN for a pascal interface to rom screen routines, ROMFKY for a pascal interface to function key routines, NISWIN for window manipulation routines, GETFUNKY to get function key routines, NISLIO for logical IO routines, NISTACK for procedure stack manipulation routines and PROCSEL for a procedure item processor.

6. The method of claim 3 wherein the first computer program in the host microcomputer includes a program for transfer of the patient data table to the hand held computer.

7. The method of claim 3 wherein the host microcomputer includes programs for Item, Procedure, User and Report Tables and in the hand held computer corresponding Item, Procedure and User and Report Tables.

8. A system for providing medical patient data items in a host microcomputer with a screen, printer or other visual display means for displaying the data items in table or chart form, wherein the patient data items are collected by user personnel which comprises:
(a) a first host microcomputer with a first visual display means and a first memory interface controlled by a first microprocessor including first data item entry means to the first microprocessor;
(b) a second hand held computer having a second memory interface controlled by a second microprocessor including second data item entry means to the second microprocessor and a second visual display means for showing patient data items in table form;
(c) a communication link means for removable interconnection between the first and second memory interface;
(d) a first program in the host microcomputer which transfers a first subset of previously collected and assembled patient data items to the hand held computer upon command for assembly into table form in the hand held computer, wherein the host microcomputer is programmed to produce table forms including procedures and lines for data items to be collected and for user codes for authorized users; and
(e) a second program in the hand held computer which collects a second subset of patient data in the table form using the second data entry means wherein the patient data in the second subset is related to the patient data first subset and which second program when linked with the host computer by the communication link means and memory interfaces transfers the second subset of patient data to the host microcomputer, wherein the second subset of patient data items are collected through user personnel in the hand held computer using the second data item entry means and with a comparison of the second subset of patient data items to the first subset of patient data items on the second visual display means for immediately determining the health of the patient items;

wherein the second program is run in the hand held computer and the first program is run in the host microcomputer to transfer the second subset of patient data items in the hand held computer to the host microcomputer by the communications link means and memory interfaces and to thereby empty the hand held computer of all patient data items;

wherein the second program is run in the hand held computer and the first program in the host microcomputer to receive the first subset of patient data items in the hand held computer through the communication link means; and wherein the first program is run in the host microcomputer to produce reports based upon the first or second subset or both patient data in the host microcomputer for visualization on the display means, wherein the first subset of patient data transferred to the hand held computer varies over time according to varying patients and user personnel.

9. The system of claim 8 wherein the communications link is a docking device which utilizes an RS232 cable.

10. The system of claim 8 wherein the hand held computer includes a microprocessor handling between 32K and 64K bytes of high speed memory, an alphanumeric keyboard with programmable function keys, at least a 40 character display with 8 lines.

11. The system of claim 10 wherein the hand held computer has a monochromic liquid crystal display.

12. The system of claim 10 wherein the host microcomputer includes a minimum of 512K byte memory, two disk drives, a keyboard and an at least a 1920 character display.

* * * * *